US008291327B2

(12) United States Patent
Bates et al.

(10) Patent No.: US 8,291,327 B2
(45) Date of Patent: Oct. 16, 2012

(54) DETECTING AVATAR FOLLOWING IN A VIRTUAL ENVIRONMENT

(75) Inventors: Cary L. Bates, Rochester, MN (US); Jim C. Chen, Rochester, MN (US); Zachary A. Garbow, Rochester, MN (US); Gregory E. Young, South St. Paul, MN (US)

(73) Assignee: International Business Machines Corporation, Armonk, NY (US)

( * ) Notice: Subject to any disclaimer, the term of this patent is extended or adjusted under 35 U.S.C. 154(b) by 628 days.

(21) Appl. No.: 12/353,581

(22) Filed: Jan. 14, 2009

(65) Prior Publication Data
US 2010/0180215 A1    Jul. 15, 2010

(51) Int. Cl.
*G06F 3/033*    (2006.01)
(52) U.S. Cl. ........ 715/757; 715/848; 715/849; 715/850; 715/851; 715/852
(58) Field of Classification Search .................. 715/757, 715/848–852
See application file for complete search history.

(56) References Cited

U.S. PATENT DOCUMENTS

| | | | |
|---|---|---|---|
| 6,734,885 B1 * | 5/2004 | Matsuda ...................... 715/848 |
| 7,293,235 B1 | 11/2007 | Powers et al. |
| 2003/0156134 A1 | 8/2003 | Kim |
| 2005/0179202 A1 * | 8/2005 | French et al. .................. 273/247 |
| 2008/0201321 A1 | 8/2008 | Fitzpatrick et al. |
| 2009/0132931 A1 * | 5/2009 | Tatsubori ...................... 715/752 |
| 2009/0150778 A1 * | 6/2009 | Nicol, II ........................ 715/706 |
| 2009/0174702 A1 * | 7/2009 | Garbow et al. ............... 345/419 |
| 2009/0177979 A1 * | 7/2009 | Garbow et al. ............... 715/757 |
| 2009/0251471 A1 * | 10/2009 | Bokor et al. .................. 345/474 |
| 2009/0288002 A1 * | 11/2009 | Hamilton et al. ............. 715/706 |
| 2010/0001993 A1 * | 1/2010 | Finn et al. .................... 345/419 |
| 2010/0042387 A1 * | 2/2010 | Gibbon et al. .................... 703/6 |
| 2010/0079446 A1 * | 4/2010 | Betzler et al. ................. 345/419 |
| 2010/0082798 A1 * | 4/2010 | Bhogal et al. ................ 709/224 |
| 2010/0083148 A1 * | 4/2010 | Finn et al. .................... 715/764 |
| 2010/0180214 A1 * | 7/2010 | Bates et al. ................... 715/757 |
| 2011/0185057 A1 | 7/2011 | Waugaman et al. |

OTHER PUBLICATIONS

Patent Application entitled "Predatory Behavior Detection and Alert in Virtual Worlds Based on Spatial and Temporal Criteria," filed Jan. 14, 2009 by Cary L. Bates et al.

\* cited by examiner

*Primary Examiner* — Mark Rinehart
*Assistant Examiner* — Meseker Takele
(74) *Attorney, Agent, or Firm* — Patterson & Sheridan, LLP

(57) ABSTRACT

Embodiments of the invention provide techniques for protecting a user from being followed by an avatar within an immersive virtual environment. To detect a following avatar, any avatars within a specified range of the user may be identified. Historical data may then be examined to determine if any of the identified avatars has been in the same recent virtual locations as the user. In order to rule out coincidental movements, the likelihood of both avatars being in the same places at the same time may be evaluated. Further, the following avatar may be tested by transporting the user to another location, and then monitoring to determine whether the following avatar also transports to the same location. Upon confirming that the following avatar is actually following the user, avoidance actions may be performed in order to avoid the following avatar.

20 Claims, 5 Drawing Sheets

DETECTING AVATAR FOLLOWING IN A VIRTUAL ENVIRONMENT

BACKGROUND OF THE INVENTION

1. Field of the Invention

Embodiments of the invention relate to immersive virtual environments. More specifically, embodiments of the invention relate to determining possible predatory behavior of one avatar relative to another within an immersive virtual environment.

2. Description of the Related Art

A virtual world is a simulated environment which users may inhabit and in which the users may interact with virtual objects and locations of the virtual world. Users may also interact with one another via avatars. An avatar generally provides a graphical representation of an individual within the virtual world environment. Avatars are usually presented to other users as two or three-dimensional graphical representations of humanoids. Frequently, virtual worlds allow for multiple users to enter and interact with one another. Virtual worlds provide an immersive environment as they typically appear similar to the real world, with real world rules such as gravity, topography, locomotion, real-time actions, and communication. Communication may be in the form of text messages sent between avatars, real-time voice communication, gestures displayed by avatars, symbols visible in the virtual world, and the like.

Virtual worlds may be persistent. A persistent world provides an immersive environment (e.g., a fantasy setting used as a setting for a role-playing game, or a virtual world complete with land, buildings, towns, and economies) that is generally always available, and world events happen continually, regardless of the presence of a given avatar. Thus, unlike more conventional online games or multi-user environments, the virtual world continues to exist, and plots and events continue to occur as users enter (and exit) the virtual world.

SUMMARY OF THE INVENTION

One embodiment of the invention includes a computer-implemented method for protecting a user of a virtual world. The method generally includes determining that a target avatar under the control of a user is being followed by a following avatar within a virtual world, wherein the determining comprises: evaluating a likelihood of both the target avatar and the following avatar being sufficiently spatially and temporally coincident according to predefined predatory criteria; and applying exceptions criteria to exclude selected avatars from being identified as the following avatar even if the selected avatars satisfy the predefined predatory criteria. The method may also include: determining one or more avoidance actions to enable the user to avoid being followed by the following avatar; and performing the determined one or more avoidance actions.

Another embodiment of the invention includes a computer-readable storage medium containing a program, which when executed on a processor performs an operation. The operation may generally include determining that a target avatar under the control of a user is being followed by a following avatar within a virtual world, wherein the determining comprises: evaluating a likelihood of both the target avatar and the following avatar being sufficiently spatially and temporally coincident according to predefined predatory criteria; and applying exceptions criteria to exclude selected avatars from being identified as the following avatar even if the selected avatars satisfy the predefined predatory criteria. The operation may also include: determining one or more avoidance actions to enable the user to avoid being followed by the following avatar; and performing the determined one or more avoidance actions.

Still another embodiment of the invention includes a system having a processor and a memory containing a program, which when executed by the processor is configured to perform an operation. The operation may generally include determining that a target avatar under the control of a user is being followed by a following avatar within a virtual world, wherein the determining comprises: evaluating a likelihood of both the target avatar and the following avatar being sufficiently spatially and temporally coincident according to predefined predatory criteria; and applying exceptions criteria to exclude selected avatars from being identified as the following avatar even if the selected avatars satisfy the predefined predatory criteria. The operation may also include: determining one or more avoidance actions to enable the user to avoid being followed by the following avatar; and performing the determined one or more avoidance actions.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
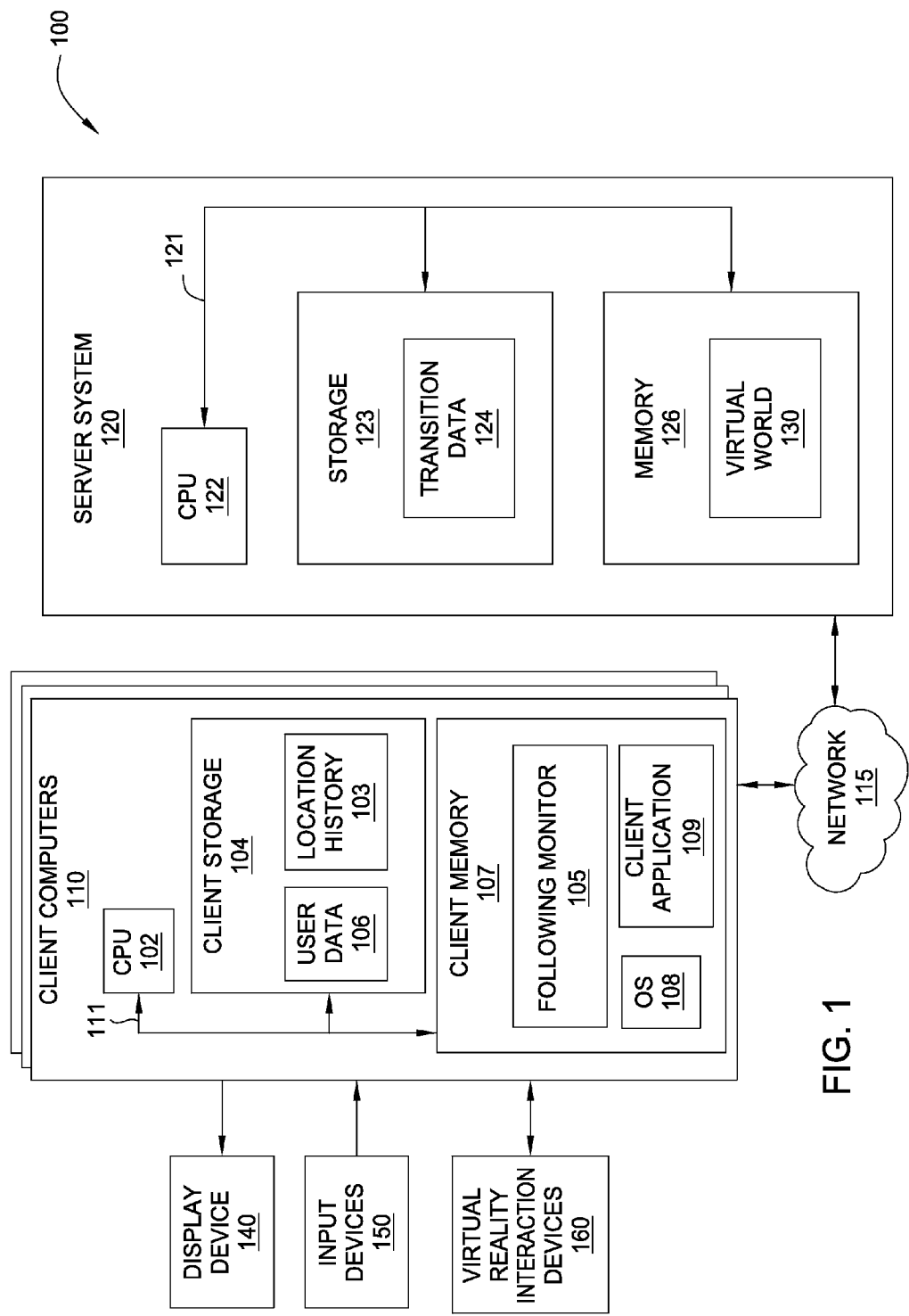
FIG. 1 is a block diagram that illustrates a client server view of computing environment, according to one embodiment of the invention.

A virtual world is a simulated environment in which users may be represented by avatars. An avatar may be used to "travel" through locations of the virtual world, such as virtual streets, buildings, rooms, etc. While in a given location, an avatar may also be used to interact with objects or other avatars present therein. For example, an avatar may be able to approach another avatar, and may interact with the other avatar by communicating, performing a financial transactions, and the like. Thus, multiple users, although in different physical locations, may be present in the same virtual location, and may interact therein by using their respective avatars.

However, some problems of interacting in the physical world may also occur in the virtual world. In particular, a user's avatar may be followed and spied upon by another avatar (hereinafter referred to as a "following avatar"). For example, a following avatar may observe or "overhear" a conversation in which a user reveals sensitive information (e.g., a user identification, a password, an account number, etc.). In such a situation, the following avatar may be seeking to commit identity theft, or may be a stalker wishing to learn private information about the followed user.

Embodiments of the invention provide techniques for protecting a user from being followed by an avatar within an immersive virtual environment. To detect a following avatar, any avatars within a specified range (e.g., a virtual hearing range) of the user may be identified. Historical data may then be examined to determine if any of the identified avatars has been in the same recent virtual locations as the user. In order to rule out coincidental movements, the likelihood of both avatars being in the same places at the same time may be evaluated. Further, the following avatar may be tested by transporting the user to another location, and then monitoring to determine whether the following avatar also transports to the same location. Upon confirming that the following avatar is actually following the user, avoidance actions may be performed in order to avoid the following avatar.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard-disk drive or random-access memory) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram that illustrates a client server view of computing environment 100, according to one embodiment of the invention. As shown, computing environment 100 includes client computers 110, network 115 and server system 120. In one embodiment, the computer systems illustrated in environment 100 may include existing computer systems, e.g., desktop computers, server computers, laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

As shown, each client computer 110 includes a central processing unit (CPU) 102, which obtains instructions and data via a bus 111 from client memory 107 and client storage 104. CPU 102 is a programmable logic device that performs all the instruction, logic, and mathematical processing in a computer. As shown, client storage 104 includes user data 106 and location history 103, which are described further below. Client storage 104 may represent hard-disk drives, flash memory devices, optical media and the like. Client computer 110 is operably connected to the network 115.

Client memory 107 includes an operating system (OS) 108, a client application 109 and a follower monitor 105. Operating system 108 is the software used for managing the operation of the client computer 110. Examples of OS 108 include UNIX, a version of the Microsoft Windows® operating system, and distributions of the Linux® operating system. (Note, Linux is a trademark of Linus Torvalds in the United States and other countries.)

In one embodiment, the client application 109 provides a software program that allows a user to connect to a virtual world 130, and once connected, to perform various user actions. Such actions may include exploring virtual locations, interacting with other avatars, and interacting with virtual objects. Further, the client application 109 may be configured to generate and display a visual representation of the user within the immersive environment, generally referred to as an avatar. The avatar of the user is generally visible to other users in the virtual world, and the user may view avatars representing the other users. The client application 109 may also be configured to generate and display the immersive environment to the user and to transmit the user's desired actions to the virtual world 130 on the server 120. Such a display may include content from the virtual world determined from the user's line of sight at any given time. For the user, the display may include the avatar of that user or may be a camera eye where the user sees the virtual world through the eyes of the avatar representing this user.

Figure 2:
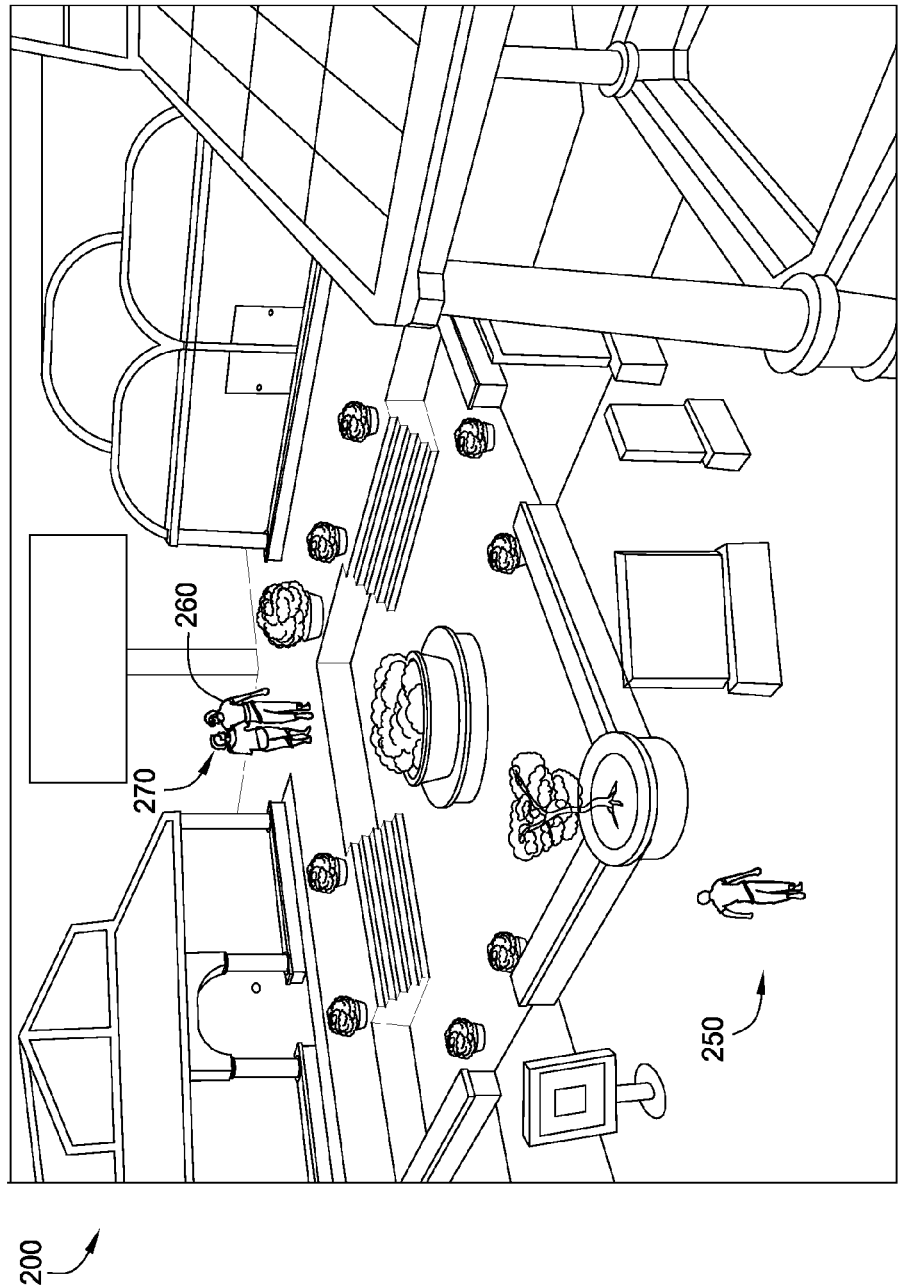
FIG. 2 illustrates a user display for a user participating in a virtual world, according to one embodiment of the invention.

By way of example, FIG. 2 illustrates a user display 200 for a user participating in a virtual world, according to one embodiment of the invention. In this example, the main user is represented by a target avatar 270, and is present in a virtual town square. The user may interact with elements of the virtual world, including a second avatar 260, which represents another user. For example, the user may control the target avatar 270 to initiate a contact with the second avatar 260, thus enabling the main user to engage in conversation with the other user. One technique used to enable a conversation in the virtual world is to display text entered by the users in speech bubbles above the avatars (i.e., similar to speech bubbles shown in comic books). Another technique is to display text entered by the users in a chat window. Yet another technique is to enable real-time voice conversations (e.g., using VOIP technology).

As shown, a third avatar 250 is present in the same location as the two avatars engaged in conversation. By being in the same location, the user of third avatar 250 may be able to gather information about the target avatar 270 (e.g., places visited, persons talked to, actions performed, etc.). Further, the user of the third avatar 250 may follow the target avatar 270 to various locations of the virtual world in order to continue to observe the target avatar 270. The ability of the user of the third avatar 250 to view the target avatar 270 may be limited by a specified visual range, meaning a predefined distance for one avatar to view another avatar according to the rules of the virtual world 130. The visual range may be based on, e.g., a line of sight around intervening objects, virtual lighting conditions, virtual weather conditions, and the like. Furthermore, if the third avatar 250 is within a specified hearing range, the user of the third avatar 250 may be able to "listen in" to the conversation between the avatars 260 and 270. That is, the user of the third avatar 250 may be able to view speech bubbles above the heads of the avatars of the users engaged in conversation, may be able to read text displayed in a chat window, or may hear voice communications output from a sound device. Thus, the user of the third avatar 250 may be able to surreptitiously obtain sensitive or private information revealed by the target avatar 270 in a conversation. The hearing range may be limited to a predefined distance for "hearing" other avatars according to the rules of the virtual world 130. The hearing range may take into account any intervening objects included in the virtual world, which may be defined as obstructing sight and/or sounds between the avatars. The hearing range may also be limited by other factors, for example any background noise existing in the same location as the avatars. In another embodiment, a user may be limited to "listen" to a conversation based on a visual range for the user's avatar to view another avatar.

Referring again to FIG. 1, the user may view the virtual world using a display device 140, such as an LCD or CRT monitor display, and interact with the client application 109 using input devices 150. Further, in one embodiment, the user may interact with the client application 109 and the virtual world 130 using a variety of virtual reality interaction devices 160. For example, the user may don a set of virtual reality goggles that have a screen display for each lens. Further, the goggles could be equipped with motion sensors that cause the view of the virtual world presented to the user to move based on the head movements of the individual. As another example, the user could don a pair of gloves configured to translate motion and movement of the user's hands into avatar movements within the virtual reality environment. Of course, embodiments of the invention are not limited to these examples and one of ordinary skill in the art will readily recognize that the invention may be adapted for use with a variety of devices configured to present the virtual world to the user and to translate movement/motion or other actions of the user into actions performed by the avatar representing that user within the virtual world 130.

In one embodiment, the server system 120 includes a CPU 122, which obtains instructions and data via a bus 121 from memory 126 and storage 123. The processor 122 could be any processor adapted to support the methods of the invention. The memory 126 is any memory sufficiently large to hold the necessary programs and data structures. Memory 126 could be one or a combination of memory devices, including Random Access Memory, nonvolatile or backup memory, (e.g., programmable or Flash memories, read-only memories, etc.). In addition, memory 126 and storage 123 may be considered to include memory physically located elsewhere in a server 120, for example, on another computer coupled to the server 120 via bus 121. The server system 120 may be operably connected to the network 115, which generally represents any kind of data communications network. Accordingly, the network 115 may represent both local and wide area networks, including the Internet.

As shown, the memory 126 includes a virtual world 130. In one embodiment, the virtual world 130 may be a software application that allows a user to explore and interact with an immersive environment. The storage 123 may include transition data 124, representing a data structure storing historical records of avatar location transitions within the virtual world 130. The virtual world 130 may be configured to generate the transition data 124 by, e.g., recording or counting each instance of movement from one location to another. The transition data 124 may describe avatar location transitions in terms of location identifiers (e.g., from point A to point B), in terms of location coordinates (e.g., from coordinates X to coordinates Y), in terms of one or more keywords describing each location (e.g., from "MALL, SHOPPING, SHOES" to "RESTAURANT, ITALIAN"), and the like. Optionally, the avatar location transitions stored in transition data 124 may be limited to sudden shifts within the virtual world 130 (i.e., "teleportation"), rather than a simulated real-world movement such as walking, running, driving, etc. Further, the transition data 124 may only describe avatar location transitions for a fixed period of time (e.g., for the last 6 months, for the last year, etc.).

In one embodiment, the following monitor 105 included in a client computer 110 provides a software program configured to detect an avatar that is following the user of the virtual world 130. The following monitor 105 may detect suspected following avatars at a given virtual location by identifying any avatars that are within a hearing range of the user's avatar. Further, the following monitor 105 may exclude any avatars that belong to known friends or acquaintances of the user from being considered as suspected following avatars. For example, the following monitor 105 may ignore any avatars that have recently been (or currently are) engaged in a conversation with the user's avatar, avatars that are included in a list of known friends, and the like. Such data describing the user's friends and conversation partners may be stored in the user data 106, representing a data structure included in the client storage 104. Once suspected following avatars are detected at a given location, a list of identifiers describing the suspected following avatars may be stored, along with a description of the current location, in the location history 103. The description of the current location may include, e.g., a location identifier, one or more keywords describing the location, map coordinates, etc.

In one embodiment, the following monitor 105 may be configured to determine whether any suspected following avatars present at a given location (i.e., avatars within listening range) have also been present at other locations that the user's avatar has visited recently. For example, the following monitor 105 may analyze the location history 103 to determine if any suspected following avatars detected at a current location were also detected at previous locations. Further, the following monitor 105 may determine whether the presence of a suspected following avatar at the same sequence of locations as the user's avatar is beyond mere coincidence. For example, the following monitor 105 may determine a probability of both avatars traveling to the same locations independently. If the determined probability is below some specified threshold (e.g., a 5% probability), then the following monitor 105 may determine that the suspected following avatar is likely to be following the user's avatar. The following monitor 105 may be configured to determine a probability of an avatar traveling to a sequence of locations based on historical data describing past movements of avatars within the virtual world 130. For example, the following monitor 105 may analyze the transition data 124 (stored in server system 120) in order to evaluate how often avatars have moved from one location to another, and thus determine whether a current pattern of movements fits within the historical movement patterns. This analysis may be performed in terms of specific location identifiers, in terms of location coordinates, in terms of keywords describing each location, and the like.

In one embodiment, the following monitor 105 may be configured to test whether a user's avatar is being followed. For example, the following monitor 105 may be configured to determine a test location within the virtual world 130, meaning an unusual destination of a location transition from the user's current location. That is, the following monitor 105 may analyze the transition data 124 to determine locations that are never (or seldom) destinations of location transitions starting at the current location of the user. The following monitor 105 may then present the user with the option to transition to one or more proposed test locations. If the user accepts one of the proposed test locations, the following monitor 105 may then transition the user to the selected test location. The following monitor 105 may then monitor the area to determine whether any other avatars have also transitioned from the first location to the selected test location.

In one embodiment, once it is determined that a user is being followed, the following monitor 105 may be configured to perform avoidance actions. For example, one avoidance action may be to notify the user that he is being followed by the following avatar. Avoidance actions are described further below with reference to FIG. 5.

Of course, the embodiments described above are intended to be illustrative, and are not limiting of the invention. Other embodiments are broadly contemplated. For example, the functionality of the following monitor 105 may be incorporated into the virtual world 130. That is, the virtual world 130 may be configured to detect avatar following, and to respond to such situations by performing avoidance actions.

Figure 3:
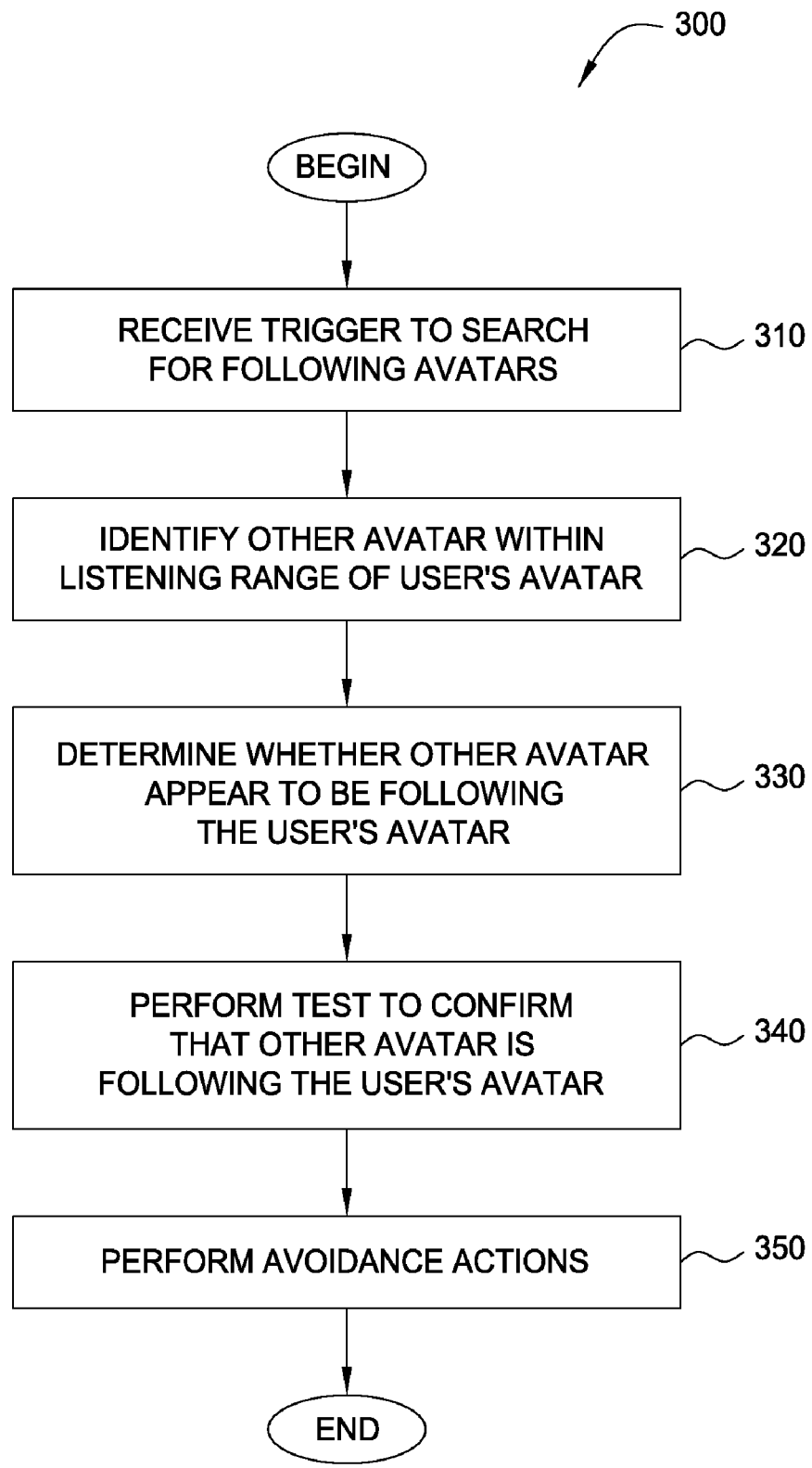
FIG. 3 is a flow diagram illustrating a method for detecting avatar following within a virtual world, according to one embodiment of the invention.

FIG. 3 is a flow diagram illustrating a method 300 for detecting avatar following within a virtual world, according to one embodiment of the invention. Persons skilled in the art will understand that, even though the method is described in conjunction with the system of FIG. 1, any system configured to perform the steps of the method 300, in any order, is within the scope of the present invention.

The method 300 begins at step 310, when a following monitor 105 receives a trigger indicating the need to perform a search for any following avatars within a virtual world (e.g., virtual world 130 illustrated in FIG. 1). Such a trigger may include a user command (e.g., menu selection, toolbar selection, etc.), a scheduled event, a situation or avatar action occurring within the virtual world (e.g., the presence of another avatar), and the like. At step 320, the following monitor 105 may identify any other avatars within a hearing range of the user's avatar.

At step 330, the following monitor 105 determines whether any avatar identified at step 320 appears to be following the user's avatar. The following monitor 105 may analyze the user data 106 to exclude any avatars that are known friends or acquaintances of the user from being considered as suspected following avatars. Further, the following monitor 105 may analyze the location history 103 to determine whether a suspected avatar has been present in the same locations that the user's avatar was recently in. If so, the following monitor 105 may determine whether the suspected avatar's presence at the same locations may be due to random probability (i.e., by coincidence) rather than intentional following of the user's avatar. For example, the following monitor 105 may analyze the transition data 124 to determine past patterns of location transitions for all users of the virtual world 130, and thus determine the likelihood of a given pattern of location transitions occurring randomly. Generally, as the number of location transitions shared by the avatars increases, the likelihood that the coincidences are due to random probability decreases. If the likelihood that shared location transitions are due to random probability is determined to be below some predefined threshold, the following monitor 105 may determine that the user is being followed by the following avatar. In one embodiment, the threshold indicating that the user is being followed may be adjusted based on the nature of interactions that the user is engaged in within the virtual world 130. For example, if the user is discussing sensitive information (e.g., financial transactions, personal information, etc.) with other avatars, then the threshold may be increased in order to ensure greater caution in protecting the user.

At step 340, the following monitor 105 may perform a test to confirm that the user's avatar is being followed. One exemplary method to perform a confirmation test is described below with reference to FIG. 4. At step 350, after determining that the user is being followed, the following monitor 105 may perform avoidance actions to protect the user. One exemplary method to perform avoidance actions is described below with reference to FIG. 5. After step 350, the method 300 terminates.

Figure 4:
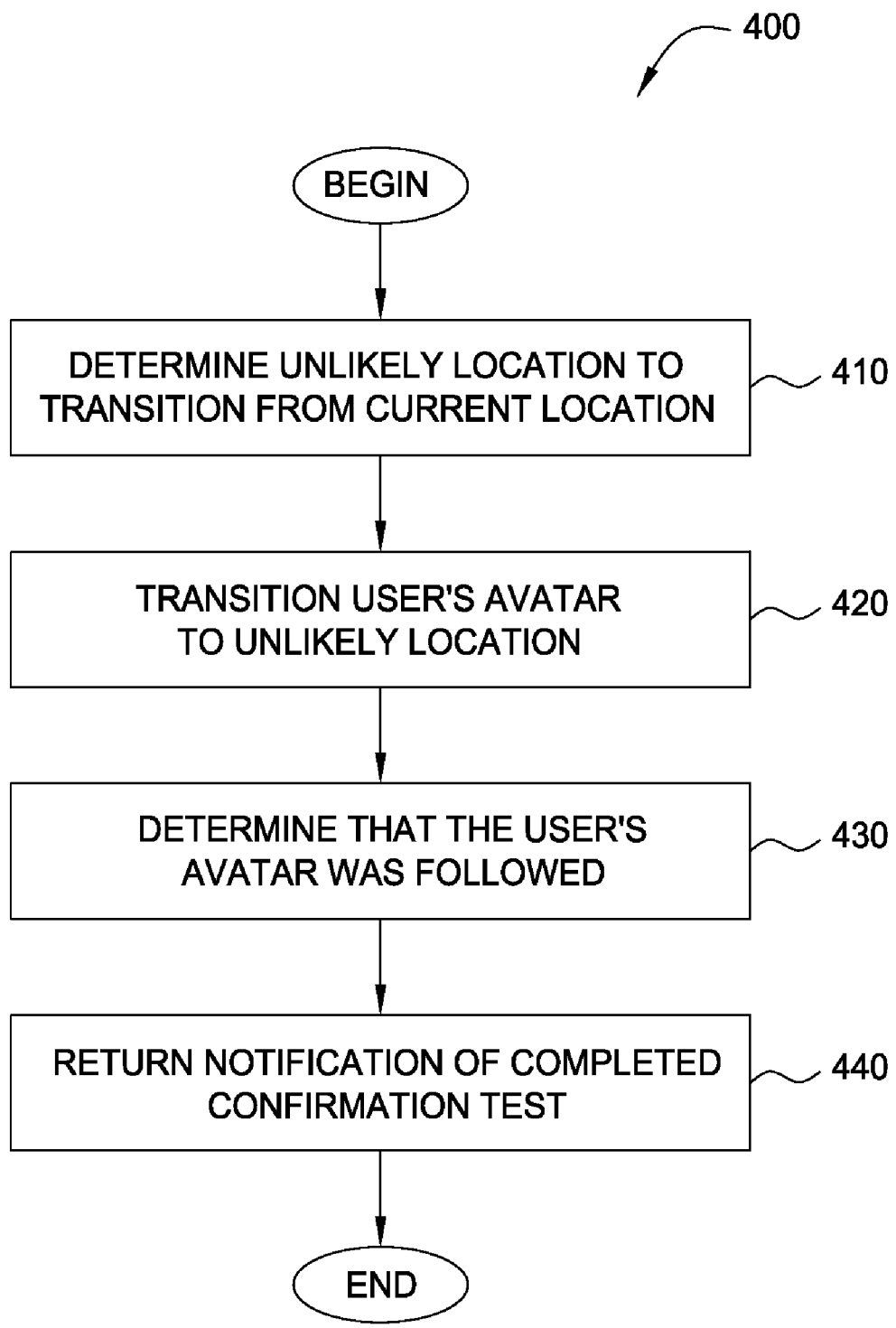
FIG. 4 is a flow diagram illustrating a method for performing a confirmation test of a suspected following avatar, according to one embodiment of the invention.

FIG. 4 is a flow diagram illustrating a method 400 for performing a confirmation test of a suspected following avatar, according to one embodiment of the invention. For the sake of illustration, method 400 is described in conjunction with the system of FIG. 1. However, persons skilled in the art will understand that any system configured to perform the steps of method 400, in any order, is within the scope of the present invention.

The method 400 represents one embodiment of the step 340 of the method 300 illustrated in FIG. 3. Thus, the method 400 may be performed after detecting a suspected following avatar within the virtual world 130. The method 400 begins at step 410, where a following monitor 105 determines a test location within the virtual world 130 that represents an unusual destination for an avatar present at the user's current location. For example, the following monitor 105 may analyze the transition data 124 to determine a location that is rarely a destination of an avatar location transition from the current location of the user. Optionally, the following monitor 105 may present the user with a list of proposed test locations, and receive the user's selection of a specific location to transition to.

At step 420, the following monitor 105 may transition the user's avatar to the test location. The transition may occur in response to the user accepting a particular test location from one or more proposed test locations. At step 430, the following monitor 105 may determine that the user's avatar was followed to the test location. For example, the following monitor 105 may monitor the test location to determine whether any other avatars have also transitioned from the first location to the test location. At step 440, the following monitor 105 may return a notification that the confirmation test has been completed. For example, if it determined at step 430 that the following avatar did follow the user to the test location, then the following monitor 105 may return a notification that the user is being followed. After step 440, the method 400 terminates.

Figure 5:
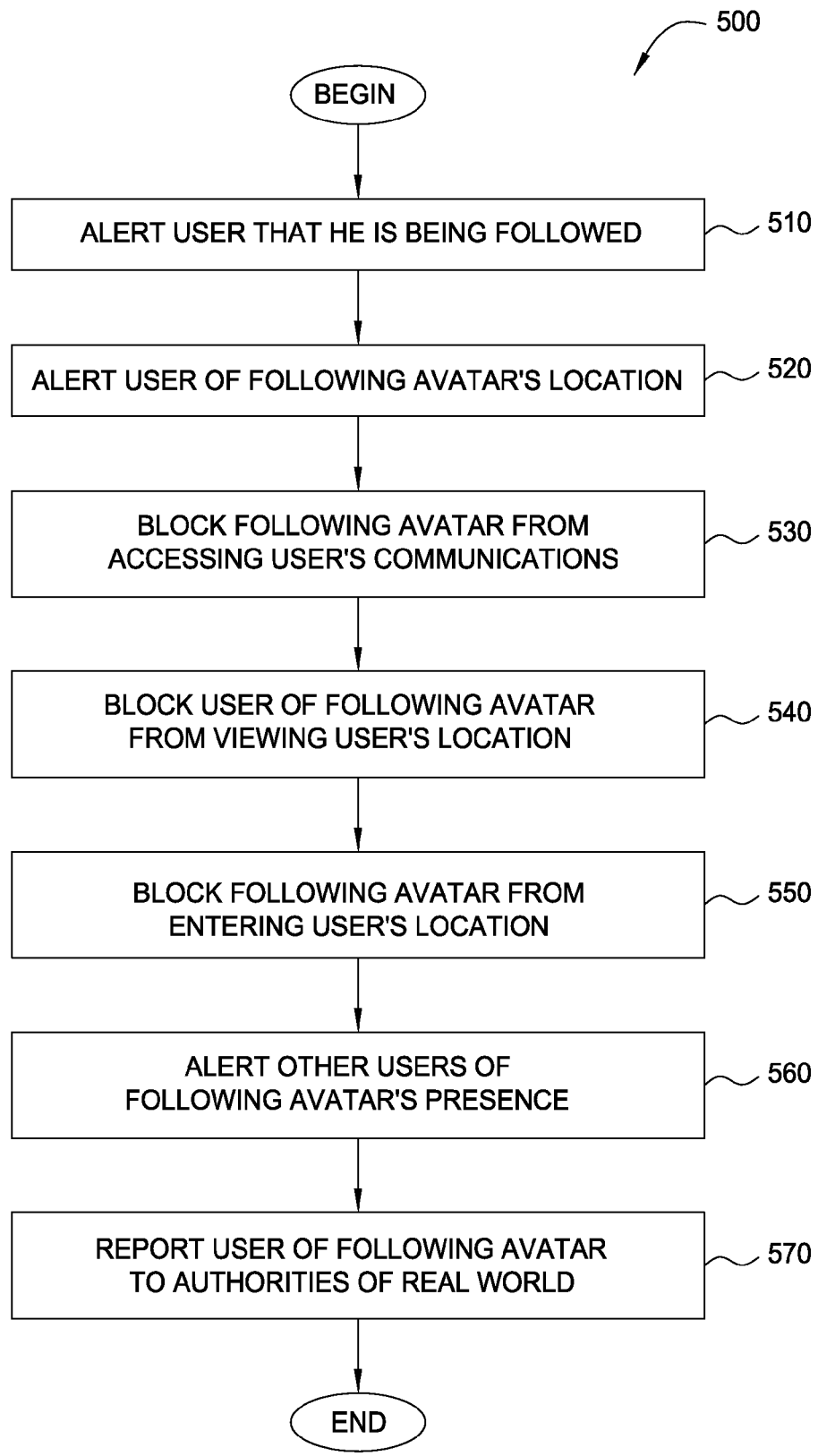
FIG. 5 is a flow diagram illustrating a method for performing avoidance actions to avoid a following avatar, according to one embodiment of the invention.

FIG. 5 is a flow diagram illustrating a method 500 for performing avoidance actions to avoid a following avatar, according to one embodiment of the invention. For the sake of illustration, method 500 is described in conjunction with the system of FIG. 1. However, persons skilled in the art will understand that any system configured to perform the steps of method 500, in any order, is within the scope of the present invention.

The method 500 represents one embodiment of the step 350 of the method 300 illustrated in FIG. 3. In one embodiment, the steps of method 500 are performed incrementally until the user is no longer being followed by a following avatar. The method 500 begins at step 510, by alerting the user that he is being followed. For example, the following monitor 105 may present the user with the name of the user of the following avatar, an identifier of the following avatar, a description of the visual appearance of the following avatar, or a graphic indicator of the following avatar. Such data may be presented within a visual display of the virtual world 130 (e.g., the user display 200 shown in FIG. 2). At step 520, the user may be alerted to the following avatar's subsequent locations. That is, at a time when the user is not currently being followed, the user may be alerted to a current location of an avatar that was previously identified as being a following avatar. The user can then avoid entering any locations in which the following avatar may be present, thus avoiding unwanted encounters with the following avatar.

At step 530, the user of the following avatar may be blocked from accessing the user's communications. For example, the following avatar may be blocked from "listening in" on the user's dialog balloons, chat text, voice chat, etc., while in the same location within the virtual world 130. At step 540, the user of the following avatar may be blocked from viewing the user's current location within the virtual world 130. At step 550, the following avatar may be blocked from entering the same virtual location that the user is currently in. The blocked location may be a single version of a location of the virtual world 130, or may be a particular instance of multiple versions of a location of the virtual world 130.

At step 560, the users of other avatars may be alerted to the presence of the following avatar. For example, the following monitor 105 may access the user data 106 to identify friends of the user being followed, and may alert the friends of the presence of the following avatar. At step 570, the user of the following avatar may be reported to real-world authorities (e.g., a police department, a system administrator, etc.). This action may include sending collected evidence of acts of following the user, including data describing similar location transitions, results of confirmation tests, and the like. After step 570, the method 500 terminates.

Of course, methods 300, 400 and 500 are provided for illustrative purposes only, and are not limiting of the invention. It is contemplated that the steps of method 300, 400 and 500 may be performed in a different order or combination, depending on the severity of the interaction. Further, methods 300, 400 and 500 may be modified to incorporate other preventative actions. Such modifications may be made to suit particular situations, and are thus contemplated to be in the scope of the invention.

While the foregoing is directed to embodiments of the present invention, other and further embodiments of the invention may be devised without departing from the basic scope thereof, and the scope thereof is determined by the claims that follow.

What is claimed is:

1. A computer implemented method, comprising:
determining that a target avatar under the control of a user is being followed by a following avatar within a virtual world, wherein the determining comprises:
evaluating a likelihood of both the target avatar and the following avatar being sufficiently spatially and temporally coincident according to predefined predatory criteria; and
applying exceptions criteria to exclude selected avatars from being identified as the following avatar even if the selected avatars satisfy the predefined predatory criteria;
determining one or more avoidance actions to enable the user to avoid being followed by the following avatar; and
performing the determined one or more avoidance actions.

2. The computer-implemented method of claim 1, wherein the predefined predatory criteria comprise, for each of a plurality of virtual locations, the presence of the following avatar within a predefined proximity to the target avatar.

3. The computer-implemented method of claim 1, wherein the one or more avoidance actions comprise notifying the user that the target avatar is being followed by the following avatar within the virtual world.

4. The computer-implemented method of claim 3, wherein notifying the user that the target avatar is being followed by the following avatar comprises at least one of (i) a name of the user of the following avatar, (ii) an identifier of the following avatar, (iii) a description of the visual appearance of the following avatar, and (iv) a graphic indicator of the following avatar shown within a visual display of the virtual world.

5. The computer-implemented method of claim 1, wherein the one or more avoidance actions comprise alerting the user of a current location of the following avatar within the virtual world.

6. The computer-implemented method of claim 1, wherein the one or more avoidance actions comprise blocking the following avatar from viewing a current location of the target avatar within the virtual world.

7. The computer-implemented method of claim 1, wherein the one or more avoidance actions comprise blocking the following avatar from accessing communications of the target avatar within the virtual world.

8. The computer-implemented method of claim 1, wherein the one or more avoidance actions comprise notifying one or more responsible authorities of the following avatar, and wherein the one or more responsible authorities are selected from (i) a system administrator and (ii) a police authority.

9. The computer-implemented method of claim 1, wherein the one or more avoidance actions comprise blocking the following avatar from coming within a predefined distance of a current location of the target avatar in the virtual world.

10. A computer-readable storage medium containing a program, which when executed on a processor performs an operation, the operation comprising:
    determining that a target avatar under the control of a user is being followed by a following avatar within a virtual world, wherein the determining comprises:
        evaluating a likelihood of both the target avatar and the following avatar being sufficiently spatially and temporally coincident according to predefined predatory criteria; and
        applying exceptions criteria to exclude selected avatars from being identified as the following avatar even if the selected avatars satisfy the predefined predatory criteria;
    determining one or more avoidance actions to enable the user to avoid being followed by the following avatar; and
    performing the determined one or more avoidance actions.

11. The computer-readable storage medium of claim 10, wherein the predefined predatory criteria comprise, for each of a plurality of virtual locations, the presence of the following avatar within a predefined proximity to the target avatar.

12. The computer-readable storage medium of claim 10, wherein the one or more avoidance actions comprise notifying the user that the target avatar is being followed by the following avatar within the virtual world.

13. The computer-readable storage medium of claim 12, wherein notifying the user that the target avatar is being followed by the following avatar comprises at least one of (i) a name of the user of the following avatar, (ii) an identifier of the following avatar, (iii) a description of the visual appearance of the following avatar, and (iv) a graphic indicator of the following avatar shown within a visual display of the virtual world.

14. The computer-readable storage medium of claim 10, wherein the one or more avoidance actions comprise alerting the user of a current location of the following avatar within the virtual world.

15. The computer-readable storage medium of claim 10, wherein the one or more avoidance actions comprise blocking the following avatar from viewing a current location of the target avatar within the virtual world.

16. The computer-readable storage medium of claim 10, wherein the one or more avoidance actions comprise blocking the following avatar from accessing communications of the target avatar within the virtual world.

17. The computer-readable storage medium of claim 10, wherein the one or more avoidance actions comprise notifying one or more responsible authorities of the following avatar, and wherein the one or more responsible authorities are selected from (i) a system administrator and (ii) a police authority.

18. The computer-readable storage medium of claim 10, wherein the one or more avoidance actions comprise blocking the following avatar from coming within a predefined distance of a current location of the target avatar in the virtual world.

19. A system, comprising:
    a processor; and
    a memory containing a program, which when executed by the processor is configured to perform an operation, the operation comprising the steps of:
        determining that a target avatar under the control of a user is being followed by a following avatar within a virtual world, wherein the determining comprises:
        evaluating a likelihood of both the target avatar and the following avatar being sufficiently spatially and temporally coincident according to predefined predatory criteria; and
        applying exceptions criteria to exclude selected avatars from being identified as the following avatar even if the selected avatars satisfy the predefined predatory criteria;
    determining one or more avoidance actions to enable the user to avoid being followed by the following avatar; and
    performing the determined one or more avoidance actions.

20. The system of claim 19, wherein the predefined predatory criteria comprise, for each of a plurality of virtual locations, the presence of the following avatar within a predefined proximity to the target avatar.

\* \* \* \* \*